United States Patent
Connor et al.

(10) Patent No.: US 8,889,314 B2
(45) Date of Patent: Nov. 18, 2014

(54) BIPOLAR PLATE FOR A FUEL CELL STACK

(75) Inventors: Eric J. Connor, Rochester, NY (US);
John C. Fagley, Victor, NY (US);
Gerald W. Fly, Geneseo, NY (US);
Wenbin Gu, Pittsford, NY (US);
Yeh-Hung Lai, Webster, NY (US);
David A. Masten, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1534 days.

(21) Appl. No.: 12/352,754

(22) Filed: Jan. 13, 2009

(65) Prior Publication Data

US 2010/0178580 A1  Jul. 15, 2010

(51) Int. Cl.
*H01M 8/04* (2006.01)
*H01M 8/10* (2006.01)
*H01M 8/24* (2006.01)
*H01M 8/02* (2006.01)

(52) U.S. Cl.
CPC .......... *H01M 8/0245* (2013.01); *H01M 8/0234* (2013.01); *H01M 8/0267* (2013.01); *Y02E 60/50* (2013.01); *H01M 2008/1095* (2013.01); *H01M 8/0206* (2013.01); *H01M 8/0232* (2013.01)
USPC ............ 429/457; 429/456; 429/523; 429/528

(58) Field of Classification Search
USPC .................. 429/457, 456, 523, 528
See application file for complete search history.

(56) References Cited

U.S. PATENT DOCUMENTS

| | | | |
|---|---|---|---|
| 5,482,792 A | 1/1996 | Faita et al. | |
| 5,565,072 A | 10/1996 | Faita et al. | |
| 5,578,388 A | 11/1996 | Faita et al. | |
| 6,022,634 A | 2/2000 | Ramunni et al. | |
| 6,503,653 B2 * | 1/2003 | Rock | 429/434 |
| 6,555,261 B1 * | 4/2003 | Lewinski et al. | 429/513 |
| 6,566,004 B1 | 5/2003 | Fly et al. | |
| 6,663,994 B1 | 12/2003 | Fly et al. | |
| 6,737,183 B1 | 5/2004 | Mazzucchelli et al. | |
| 6,835,477 B1 | 12/2004 | Brambilla et al. | |
| 6,838,202 B2 | 1/2005 | Brady et al. | |
| 6,991,869 B2 | 1/2006 | Cisar et al. | |
| 2004/0241063 A1 | 12/2004 | Appleby et al. | |
| 2006/0029840 A1 * | 2/2006 | Goebel | 429/13 |
| 2006/0183300 A1 | 8/2006 | Mosdale et al. | |
| 2006/0240308 A1 * | 10/2006 | Formanski et al. | 429/38 |
| 2006/0251948 A1 | 11/2006 | Facchi | |
| 2006/0263667 A1 | 11/2006 | Toro | |
| 2007/0015035 A1 * | 1/2007 | Izenson et al. | 429/38 |
| 2007/0196710 A1 | 8/2007 | Trifoni et al. | |

(Continued)

FOREIGN PATENT DOCUMENTS

| | | |
|---|---|---|
| CN | 1650458 A | 8/2005 |
| CN | 101212057 A | 7/2008 |
| WO | WO 2006/002871 A1 | 1/2006 |

*Primary Examiner* — Barbara Gilliam
*Assistant Examiner* — Angela Martin
(74) *Attorney, Agent, or Firm* — Fraser Clemens Martin & Miller LLC; J. Douglas Miller

(57) ABSTRACT

A bipolar plate for a fuel cell is provided that includes a pair of unipolar plates having a separator plate disposed therebetween. One of the unipolar plates is produced from a porous material to minimize cathode transport resistance at high current density. A fuel cell stack including a fuel cell and the bipolar plate is also provided.

20 Claims, 2 Drawing Sheets

(56) References Cited

U.S. PATENT DOCUMENTS

2007/0281187 A1* 12/2007 Faita et al. .................. 429/13
2008/0090129 A1   4/2008 Kunz et al.
2009/0293262 A1* 12/2009 Shimamune ................. 29/623.5
2010/0159303 A1*  6/2010 Rock et al. .................... 429/34
2011/0229823 A1*  9/2011 Rock et al. ................... 430/315

* cited by examiner

BIPOLAR PLATE FOR A FUEL CELL STACK

FIELD OF THE INVENTION

The present disclosure relates to fuel cell systems and more particularly to a bipolar plate of a fuel cell stack.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte.

The MEA generally comprises porous conductive materials, also known as gas diffusion media, which distribute reactants over the surfaces of the electrode layers. Fuel, such as hydrogen gas, is introduced at the anode where it reacts electrochemically in the presence of the catalyst to produce electrons and hydrogen cations. The electrons are conducted from the anode to the cathode through an electrical circuit disposed therebetween. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is typically interposed between a pair of electrically conductive contact elements or bipolar plates to complete a single PEM fuel cell. Bipolar plates serve as current collectors for the anode and cathode, and have appropriate flow channels and openings formed therein for distributing the fuel cell's gaseous reactants (i.e., the $H_2$ & $O_2$/air) over the surfaces of the respective electrodes. The bipolar plates may serve several additional purposes, such as provide mechanical support to withstand the compressive forces applied to hold the fuel cell stack together and provide a means to remove excess heat generated by the exothermic fuel cell reactions occurring in the fuel cell, for example.

An important measure of the fuel cell is its volumetric power density. High volumetric power density is desirable for vehicle applications of fuel cells. Volumetric power density is measured as the watt density per $cm^2$ of an individual fuel cell times the quantity of cells per linear centimeter of stack height. Therefore, it is desirable to design thin cells to achieve high volumetric power density. Volumetric power density is mostly a function of the physical design of the fuel cell components and the design of the bipolar plates. The design of the bipolar plates in the prior art has been driven by many wide ranging factors, such as cell chemistry, reactant flow configurations, material selection, system pressurization, operating temperature, and system cooling requirements, for example.

Accordingly, a need exists to produce a bipolar plate which minimizes mass transport resistance at high current density, particularly on the cathode side of the fuel cell. Desirably, the bipolar plate also achieves a minimized material cost, an optimized use of coolant, and simpler manufacturability, while maximizing volumetric power density.

SUMMARY OF THE INVENTION

In concordance and agreement with the present invention, a bipolar plate which minimizes mass transport resistance at high current density, thereby achieving a reduction in material cost, an optimized use of coolant, and simpler manufacturability, while maintaining a high volumetric power density, has been surprisingly discovered.

In one embodiment, the bipolar plate for a fuel cell comprises: a first plate adapted to distribute a reactant gas to a cathode face of a membrane electrode assembly, wherein the first plate is produced from a porous material; a second plate adapted to distribute a reactant gas to an anode face of the membrane electrode assembly; and a third plate disposed between the first plate and the second plate.

In another embodiment, the bipolar plate for a fuel cell comprises: a first plate adapted to abut a diffusion media and distribute a reactant gas to a cathode face of a membrane electrode assembly, wherein the first plate is produced from a porous material; a second plate including a plurality of lands, at least one of the lands adapted to abut a diffusion media forming a channel therebetween, wherein the channel distributes a reactant gas to an anode face of the membrane electrode assembly; and a third plate disposed between the first plate and the second plate, the third plate adapted to abut at least one of the lands of the second plate forming a channel therebetween, wherein the channel permits a fluid to flow therethrough to assist in thermal regulation of the fuel cell.

In another embodiment, the fuel cell stack comprises: at least one fuel cell having a membrane electrode assembly with an anode face and a cathode face, the membrane electrode assembly being disposed between a pair of bipolar plates, each bipolar plate having a first plate adapted to distribute a reactant gas to the cathode face, a second plate adapted to distribute a reactant gas to the anode face, and a third plate disposed between the first plate and the second plate, wherein the first plate is produced from a porous material to minimize cathode mass transport resistance.

DRAWINGS

The above, as well as other advantages of the present invention will become readily apparent to those skilled in the art from the following detailed description, particularly when considered in the light of the drawings described hereafter.

DETAILED DESCRIPTION OF THE INVENTION

Figure 1:
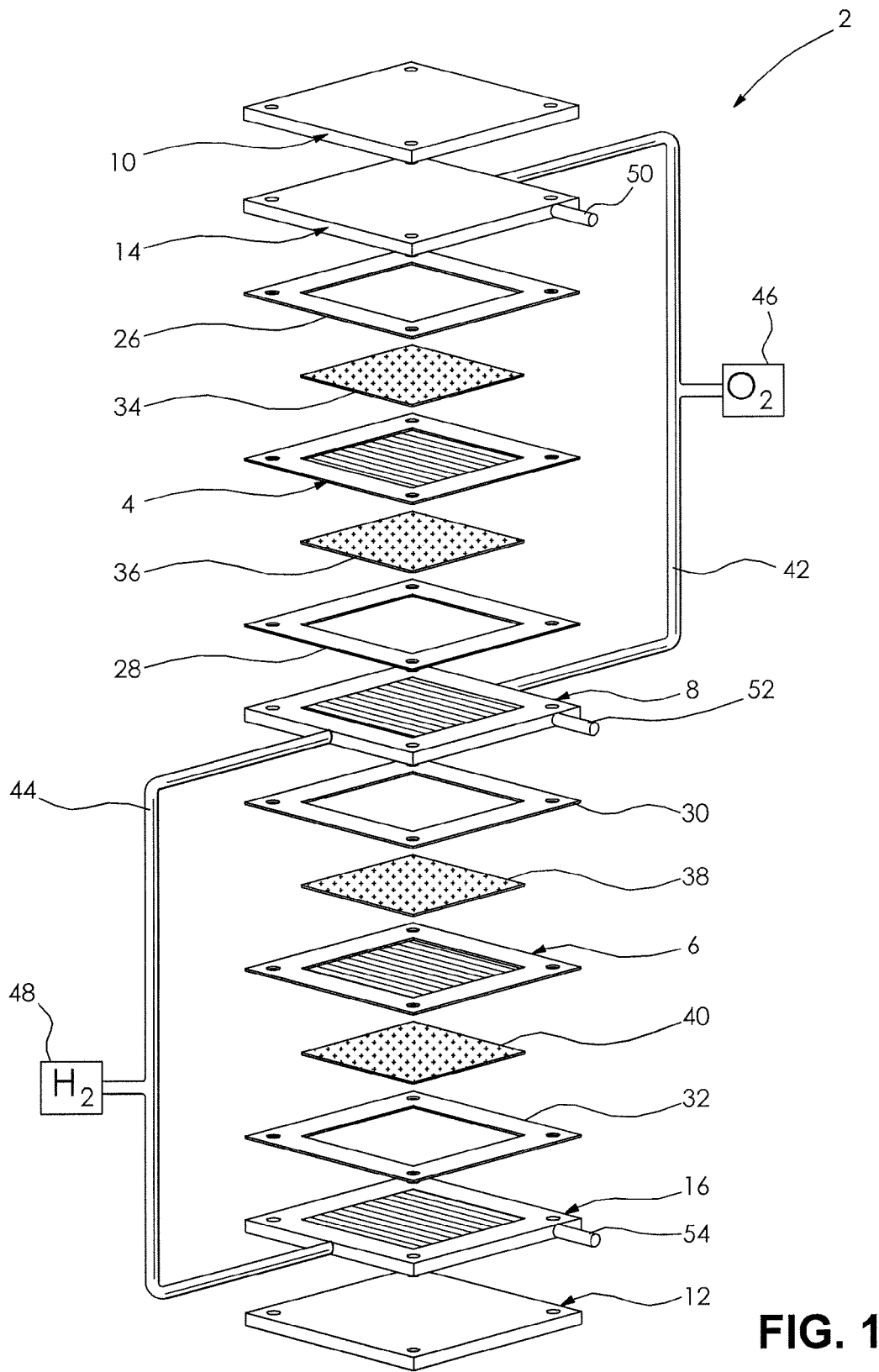
FIG. 1 illustrates a schematic, exploded perspective view of a PEM fuel cell stack (only two fuel cells shown)

The following description is merely exemplary in nature and is not intended to limit the present disclosure, application, or uses. It should also be understood that throughout the drawings, corresponding reference numerals indicate like or corresponding parts and features.

For simplicity, only a two-cell stack (i.e. one bipolar plate) is illustrated and described hereafter, it being understood that a typical stack will have many more such cells and bipolar plates.

FIG. 1 depicts a two-cell PEM fuel cell stack 2 having a pair of membrane-electrode-assemblies (MEAs) 4, 6 separated from each other by an electrically conductive fluid distribution element 8, hereinafter a bipolar plate 8. The MEAs 4, 6 and bipolar plate 8, are stacked together between end elements 10, 12, and end plates 14, 16. The end plates 14, 16 are adapted to distribute a fuel such as $H_2$ and an oxidant gas such as $O_2$, for example, to the MEAs 4, 6. Nonconductive gaskets 26, 28, 30, 32 provide seals and electrical insulation between components of the fuel cell stack 2.

Porous, electrically conductive diffusion media (DM) 34, 36, 38, 40 abut the electrode faces of the MEAs 4, 6. Such DM 34, 36, 38, 40 may be constructed of a material that facilitates dispersion of the reactants over the surface of the electrodes and hence, over the membrane facing the electrode such as a woven graphite, a graphitized sheet, and a carbon paper, for example. The end plates 14, 16 are compressed against the DMs 34, 40, respectively. The bipolar plate 8 abuts the DM 36 on an anode face of MEA 4, and is configured to accept a hydrogen-bearing reactant. The bipolar plate 8 abuts the DM 38 on a cathode face of MEA 6, and is configured to accept an oxygen-bearing reactant. The oxygen-bearing reactant is supplied to a cathode side of the fuel cell stack 2 from a source of oxygen 46 by an appropriate supply conduit 42, while the hydrogen-bearing reactant is supplied to an anode side of the fuel cell stack 2 from a source of hydrogen 48, by an appropriate supply conduit 44. Alternatively, ambient air may be supplied to the cathode side as an oxygen-bearing reactant and hydrogen to the anode side from a methanol or a gasoline reformer, or the like, for example. An exhaust conduit (not shown) for both the anode side and the cathode side of the MEAs 4, 6 is also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 are also provided.

Figure 2:
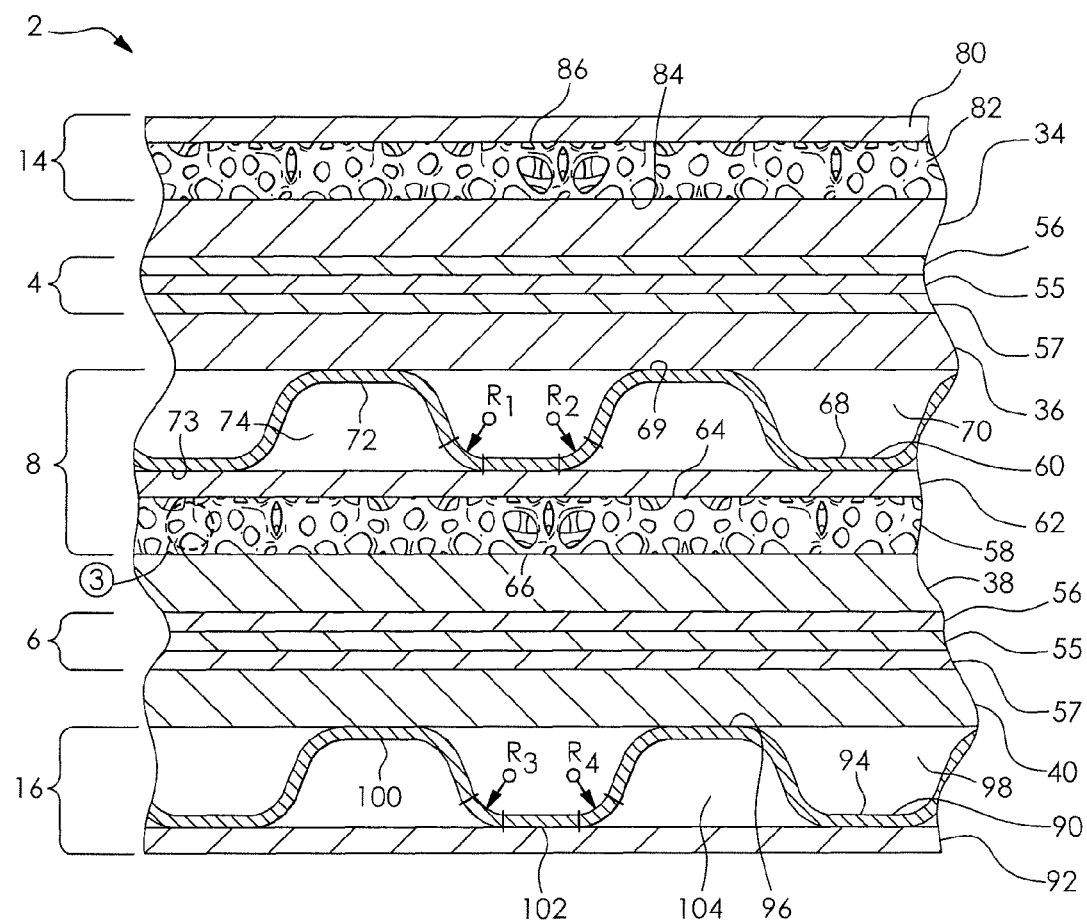
FIG. 2 is a fragmentary cross-sectional elevational view of the fuel cell stack illustrated in FIG. 1.

FIG. 2 shows a cross-section of the two-cell fuel cell stack 2 in accordance with an embodiment of the present invention. The MEAs 4, 6 include a proton exchange membrane (PEM) 55 sandwiched between a cathode 56 and an anode 57. The cathode 56 and the anode 57 typically include a porous conductive material with catalytic particles distributed therein to facilitate the electrochemical reaction of the oxygen in the cathode 56 and the hydrogen in the anode 57.

As shown, the MEAs 4, 6 are stacked together between the bipolar plate 8 and the end plates 14, 16, respectively. The bipolar plate 8 includes a first exterior sheet or unipolar plate 58, a second exterior sheet or unipolar plate 60, and an interior spacer sheet or separator plate 62 disposed between the unipolar plates 58, 60. Typically, the unipolar plates 58, 60 and the separator plate 62 are bonded together, for example by an adhesive, to form the assembled bipolar plate 8. Bonding may be accomplished, for example, by brazing, diffusion bonding, laser welding, or gluing with a conductive adhesive, as is well known in the art. Suitable binders are known to those of skill in the art and can be chosen as desired.

Figure 3:
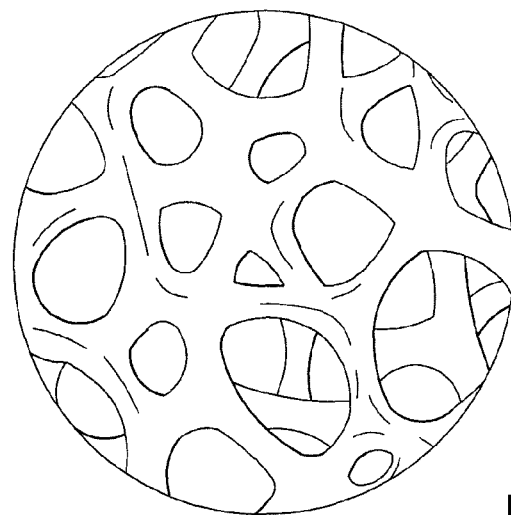
FIG. 3 is a magnified view of a porous material used to produce a bipolar plate of the fuel cell stack illustrated within circle 3 of FIG. 2.

In the embodiment shown in FIGS. 2 and 3, the unipolar plate 58 is produced from a porous material such as a metal foam (e.g. nickel foam and stainless steel foam), a carbon-based foam (e.g. graphite foam), and a microtruss material, for example. Suppliers of such foams are Ultramet, Platingtech, Mitsubishi Materials Corporation, Siping AKS Metal Material Technology Corporation, Sumitomo Electric Industries, Ltd., and Porvair plc, for example. One method and system of creating polymer materials with ordered microtruss structures is disclosed by Jacobsen in U.S. Pat. No. 7,382,959, the entire disclosure of which is hereby incorporated herein by reference. It is understood that the microtruss material can be produced by any method and system as desired. It is further understood that the microtruss material can be at least one of metalized, carbonized, and ceramicized, if desired. It should also be recognized that the porous material can be provided in any thickness, porosity, and pore size suitable for the unipolar plate 58. As a non-limiting example, the unipolar plate 58 is about 0.25 mm to about 1.0 mm thick. An internal face 64 of the unipolar plate 58 is adapted to abut the separator plate 62. An external face 66 of the unipolar plate 58 is adapted to abut the DM 38. As illustrated, the porous material of the unipolar plate 58 permits the reactant gas to contact a substantial portion of the cathode face of the MEA 6 versus a typical flow channel configuration. Accordingly, a cathode mass transport resistance is minimized. An estimated cathode mass transport resistance for a typical flow channel configuration at $1.5$ A/cm$^2$ is 60 mV. In a non-limiting example, the porous material of the unipolar plate 58 causes an approximately thirty-three percent (33%) decrease in cathode mass transport resistance or an additional 20 mV. In another non-limiting example, when a maximum power and a maximum current are held constant, a total active area of the fuel cell stack 2 is decreased by approximately three percent (3%), a cooling requirement is decreased by approximately six percent (6%), and a hydrogen consumption is decreased by approximately three percent (3%). In another non-limiting example, when the cooling requirement and the maximum power are held constant and the maximum current is increased, the cathode 56 and the DM 38 used in the fuel cell stack 2 can have approximately ten to fifteen percent (10-15%) less surface area than a cathode and a DM in a typical fuel cell stack. Although the unipolar plate 58 has a pore size from about 10 μm to about 1500 μm, it should be understood that the unipolar plate 58 can have any pore size as desired. It should be further recognized that the pore size of the porous material of the unipolar plate 58 can affect the thickness of the DM 38 (i.e. the smaller the pore size of the porous material, the thinner the DM 38 which can be employed in the fuel cell stack 2 or an elimination of the DM 38 therefrom). It is desirable that the porous material used to produce the unipolar plate 58 has a sufficient deformability and resiliency to comply with possible asperities of the separator plate 62, a negligible electrical contact resistance with the separator plate 62, and a sufficient thermal conductivity to disperse generated thermal energy. It is understood that the porous material of the unipolar plate 58 can have a variety of other physical characteristics such as hydrophilicity and permeability, for example. It is further understood that a multi-layer porous material having the above mentioned characteristics can be used to produce the unipolar plate 58, if desired.

The unipolar plate 60 is a substantially fluid impermeable, electrically and thermally conductive, and corrosion resistant sheet. The unipolar plate 60 can be produced from at least one of a metal material and a non-metal material such as a stainless steel material, an aluminum material, a titanium material, a graphite material, and a composite material, for example. Any conventional method for forming the unipolar plate 60 can be employed such as stamping, roll forming, pressure forming, and electromagnetic forming, for example. It should be recognized that the material and method of forming the unipolar plate 60 can affect a formability of the unipolar plate 60. As a non-limiting example, the unipolar plate 60 is about 0.05 mm to about 0.1 mm thick. It is understood, however, that the unipolar plate 60 can have any thickness as desired.

An internal face 68 of the unipolar plate 60 includes a plurality of lands 69. The lands 69 are adapted to abut the DM 36 to define therebetween a plurality of substantially parallel spaced apart channels 70. The channels 70 are configured for a reactant gas to flow therethrough during an operation of the fuel cell stack 2. An external face 72 of the unipolar plate 60 also includes a plurality of lands 73. The lands 73 are adapted to abut the separator plate 62 to define therebetween a plurality of substantially parallel spaced apart channels 74. The channels 74 are configured for a fluid such as a coolant, for example, to flow therethrough during the operation of the fuel cell stack 2 and assist in thermal regulation thereof. The channels 74 are adapted to permit the flow of the fluid in closer proximity to a reaction location and with no non-flowing volumes than a typical flow channel configuration. Accordingly, higher fluid temperatures and lower fluid volumes are permitted in the fuel cell stack 2 than in a typical fuel cell stack. The formability of the unipolar plate 60 permits radii R1, R2 of the channels 70 and radii of the channels 74 to be formed as desired. In the embodiment shown, the radii R1, R2 are formed to permit shallower channels 70 than a typical flow channel configuration to be defined between the unipolar plate 60 and the DM 36, thereby militating against a decrease in anode pressure.

The separator plate 62 is a substantially fluid impermeable, electrically and thermally conductive, corrosion resistant sheet. The separator plate 62 can be produced from at least one of a metal material and a non-metal material such as a stainless steel material, an aluminum material, a titanium material, a graphite material, and a composite material, for example. Any conventional method for forming the separator plate 62 can be employed such as stamping, roll forming, pressure forming, and electromagnetic forming, for example. As a non-limiting example, the separator plate 62 is about 0.02 mm to about 0.1 mm thick. It is understood, however, that the separator plate 62 can have any thickness as desired. As shown, the separator plate 62 is substantially planar, although it is understood that the separator plate 62 may include apertures and out-of-plane features such as indentations, channels, ribs, and the like, for example, as desired. The separator plate 62 can also be adapted to permit a fluid such as a coolant, for example, to flow therethrough and assist in thermal regulation of the fuel cell stack 2.

In the embodiment shown, the end plate 14 includes a separator plate 80 and a unipolar plate 82. Typically, the plates 80, 82 are bonded together, for example by an adhesive, to form the assembled end plate 14. Bonding may be accomplished, for example, by brazing, diffusion bonding, laser welding, or gluing with a conductive adhesive, as is well known in the art. Suitable binders are known to those of skill in the art and can be chosen as desired.

The separator plate 80 is a substantially fluid impermeable, electrically and thermally conductive, corrosion resistant sheet. The separator plate 80 can be produced from at least one of a metal material and a non-metal material such as a stainless steel material, an aluminum material, a titanium material, a graphite material, and a composite material, for example. Any conventional method for forming the separator plate 80 can be employed such as stamping, roll forming, pressure forming, and electromagnetic forming, for example. As a non-limiting example, the separator plate 80 is about 0.02 mm to about 0.1 mm thick. It is understood, however, that the separator plate 80 can have any thickness as desired. As shown, the separator plate 80 is substantially planar, although it is understood that the separator plate 80 may include apertures and out-of-plane features such as indentations, channels, ribs, and the like, for example, as desired. The separator plate 80 can also be adapted to permit a fluid such as a coolant, for example, to flow therethrough and assist in thermal regulation of the fuel cell stack 2.

In the embodiment shown, the unipolar plate 82 is produced from a porous material such as a metal foam (e.g. nickel foam and stainless steel foam), a carbon-based foam (e.g. graphite foam), and a microtruss material, for example. It is understood that the microtruss material can be produced by any method and system as desired. It is further understood that the microtruss material can be at least one of metalized, carbonized, and ceramicized, if desired. It should also be recognized that the porous material can be provided in any thickness, porosity, and pore size suitable for the unipolar plate 82. As a non-limiting example, the unipolar plate 82 is about 0.25 mm to about 1.0 mm thick. An internal face 84 of the unipolar plate 82 is adapted to abut the DM 34. An external face 86 of the unipolar plate 82 is adapted to abut the separator plate 80. As illustrated, the porous material of the unipolar plate 82 permits the reactant gas to contact a substantial portion of the cathode face of the MEA 4 versus a typical flow channel configuration. Accordingly, a cathode mass transport resistance is minimized. An estimated cathode mass transport resistance for a typical flow channel configuration at 1.5 A/cm$^2$ is 60 mV. In a non-limiting example, the porous material of the unipolar plate 82 causes an approximately thirty-three percent (33%) decrease in cathode mass transport resistance or an additional 20 mV. In another non-limiting example, when a maximum power and a maximum current are held constant, a total active area of the fuel cell stack 2 is decreased by approximately three percent (3%), a cooling requirement is decreased by approximately six percent (6%), and a hydrogen consumption is decreased by approximately three percent (3%). In another non-limiting example, when the cooling requirement and the maximum power are held constant and the maximum current is increased, the cathode 56 and the DM 34 used in the fuel cell stack 2 can have approximately ten to fifteen percent (10-15%) less surface area than a cathode and a DM in a typical fuel cell stack. Although the unipolar plate 82 has a pore size from about 10 µm to about 1500 µm, it should be understood that the unipolar plate 82 can have any pore size as desired. It should be further recognized that the pore size of the porous material of the unipolar plate 82 can affect the thickness of the DM 34 (i.e. the smaller the pore size of the porous material, the thinner the DM 34 which can be employed in the fuel cell stack 2 or an elimination of the DM 34 therefrom). It is desirable that the porous material used to produce the unipolar plate 82 has a sufficient deformability and resiliency to comply with possible asperities of the separator plate 80, a negligible electrical contact resistance with the separator plate 80, and a sufficient thermal conductivity to disperse generated thermal energy. It is understood that the porous material of the unipolar plate 82 can have a variety of other physical characteristics such as hydrophilicity and permeability, for example. It is further understood that a multi-layer porous material having the above mentioned characteristics can be used to produce the unipolar plate 82, if desired.

In the embodiment shown, the end plate 16 includes a unipolar plate 90 and a separator plate 92. The unipolar plate 90 is a substantially fluid impermeable, electrically and thermally conductive, and corrosion resistant sheet. The unipolar plate 90 can be produced from at least one of a metal material and a non-metal material such as a stainless steel material, an aluminum material, a titanium material, a graphite material, and a composite material, for example. Any conventional method for forming the unipolar plate 90 can be employed such as stamping, roll forming, pressure forming, and electromagnetic forming, for example. It should be recognized that the material and method of forming the unipolar plate 90 can affect a formability of the unipolar plate 90. As a non-limiting example, the unipolar plate 90 is about 0.05 mm to about 0.1 mm thick. It is understood, however, that the unipolar plate 90 can have any thickness as desired.

An internal face 94 of the unipolar plate 90 includes a plurality of lands 96. The lands 96 are adapted to abut the DM 40 to define therebetween a plurality of substantially parallel spaced apart channels 98. The channels 98 are configured for a reactant gas to flow therethrough during an operation of the fuel cell stack 2. An external face 100 of the unipolar plate 90 also includes a plurality of lands 102. The lands 102 are adapted to abut the separator plate 92 to define therebetween a plurality of substantially parallel spaced apart channels 104. The channels 104 are configured for a fluid such as a coolant, for example, to flow therethrough during the operation of the fuel cell stack 2 and assist in thermal regulation thereof. The channels 104 are adapted to permit the flow of the fluid in closer proximity to a reaction location and with no non-flowing volumes than a typical flow channel configuration. Accordingly, higher fluid temperatures and lower fluid volumes are permitted in the fuel cell stack 2 than in a typical fuel cell stack. The formability of the unipolar plate 90 permits radii R3, R4 of the channels 98 and radii of the channels 104 to be formed as desired. In the embodiment shown, the radii R3, R4 are formed to permit shallower channels 98 than a typical flow channel configuration to be defined between the unipolar plate 90 and the DM 40, thereby militating against a decrease in anode pressure.

The close proximity of the channels 74, 104 to the anode 57 of the respective MEAs 4, 6 in combination with a relatively poor thermal conductivity of the porous material of the unipolar plates 58, 82 results in a steeper thermal gradient on the anode face of the MEAs 4, 6. Accordingly, the anode 57 of the MEAs 4, 6 is cooler than an anode of a fuel cell having a typical flow channel configuration. The cooler anode 57 of the MEAs 4, 6 causes water to be urged from the cathode 56 of the MEAs 4, 6 towards the anode 57 thereof, thereby opposing osmotic drag. Accordingly, an ionic conductivity of the MEAs 4, 6 and liquid water management of the fuel cell stack 2 is maximized, while external humidification requirements of the fuel cell stack 2 are minimized.

The separator plate 92 is a substantially fluid impermeable, electrically and thermally conductive, corrosion resistant sheet. The separator plate 92 can be produced from at least one of a metal material and a non-metal material such as a stainless steel material, an aluminum material, a titanium material, a graphite material, and a composite material, for example. Any conventional method for forming the separator plate 92 can be employed such as stamping, roll forming, pressure forming, and electromagnetic forming, for example. As a non-limiting example, the separator plate 92 is about 0.02 mm to about 0.1 mm thick. It is understood, however, that the separator plate 92 can have any thickness as desired. As shown, the separator plate 92 is substantially planar, although it is understood that the separator plate 92 may include apertures and out-of-plane features such as indentations, channels, ribs, and the like, for example, as desired. The separator plate 92 can also be adapted to permit a fluid such as a coolant, for example, to flow therethrough and assist in thermal regulation of the fuel cell stack 2.

In operation, the bipolar plate 8 of the present invention can be used in the fuel cell stack 2. Such fuel cell stacks 2 can be used in power systems for operating a vehicle, for example. When in operation as part of the fuel cell stack 2, the unipolar plates 58, 82 provide substantially even distribution of the reactant gas over the active surface of the cathode 56 of the MEAs 4, 6. The reactant gas militates against liquid water stagnation in the cathode 56. In particular, the pressure of the reactant gas forces moisture, produced by the fuel cell electrochemical reaction and from external humidification, through the pores of the porous material of the unipolar plates 58, 82. Stagnant liquid water can reduce the overall efficiency of the fuel cell stack 2 and may lead to fuel cell stack 2 failure. The inhibition of liquid water stagnation results in a reduced occurrence of corrosion of a carbon catalyst support in the MEAs 4, 6. Freeze capability of the fuel cell stack 2 during operation under frigid conditions is also maximized with the present invention. It should be understood that minimizing cathode mass transport resistance at high current density, while maintaining high volumetric efficiency, increases performance of the fuel cell stack 2 over a fuel cell stack having a typical flow channel configuration. Particularly, minimizing cathode mass transport resistance equates to higher fuel cell voltage, thereby resulting in lower fuel cell stack 2 cooling requirements, fewer fuel cells in the fuel cell stack 2, higher efficiency of the fuel cell stack 2, and lower costs.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate for a fuel cell comprising:
   a first plate adapted to distribute a reactant gas to a cathode face of a membrane electrode assembly, wherein the first plate is produced from a porous material;
   a second plate including a plurality of lands, at least one of the lands adapted to abut a diffusion media forming a channel therebetween, wherein the channel distributes a reactant gas to an anode face of the membrane electrode assembly; and
   a third plate disposed between the first plate and the second plate, the third plate being substantially planar and adapted to abut at least one of the lands of the second plate forming a channel therebetween, wherein the channel permits a fluid to flow therethrough to assist in thermal regulation of the fuel cell.

2. The bipolar plate according to claim 1, wherein the porous material of the first plate is at least one of a porous metal material, a porous carbon-based material, and a microtruss material.

3. The bipolar plate according to claim 1, wherein the porous material of the first plate is a multi-layer porous material.

4. The bipolar plate according to claim 1, wherein the first plate is about 0.25 mm to about 1.0 mm thick.

5. The bipolar plate according to claim 1, wherein the second plate is produced from at least one of a metal material and a non-metal material.

6. The bipolar plate according to claim 1, wherein the second plate is at least one of substantially fluid impermeable, electrically conductive, thermally conductive, and corrosion resistant.

7. The bipolar plate according to claim 1, wherein the second plate is about 0.05 mm to about 0.1 mm thick.

8. The bipolar plate according to claim 1, wherein the second plate is adapted to permit a fluid to flow therethrough to assist in thermal regulation of the fuel cell.

9. The bipolar plate according to claim 1, wherein the third plate is produced from at least one of a metal material and a non-metal material.

10. The bipolar plate according to claim 1, wherein the third plate is at least one of substantially fluid impermeable, electrically conductive, thermally conductive, and corrosion resistant.

11. The bipolar plate according to claim 1, wherein the third plate is about 0.02 mm to about 0.1 mm thick.

12. A bipolar plate for a fuel cell comprising:
    a first plate adapted to distribute a reactant gas to a cathode face of a membrane electrode assembly, wherein the first plate is produced from a porous material;

a second plate including a plurality of lands, at least one of the lands adapted to abut a diffusion media forming a channel therebetween, wherein the channel distributes a reactant gas to an anode face of the membrane electrode assembly;

a third plate disposed between the first plate and the second plate, the third plate adapted to abut at least one of the lands of the second plate forming a channel therebetween, wherein the channel permits a fluid to flow therethrough to assist in thermal regulation of the fuel cell; and a diffusion media, wherein the first plate abuts the diffusion media.

13. A fuel cell stack comprising:

at least one fuel cell having a membrane electrode assembly with an anode face and a cathode face, the membrane electrode assembly disposed between a pair of diffusion media, the membrane electrode assembly and the pair of diffusion media further disposed between a pair of bipolar plates, each bipolar plate including:

a first plate adapted to distribute a reactant gas to the cathode face, wherein the first plate is produced from a porous material to minimize cathode mass transport resistance;

a second plate including a plurality of lands, at least one of the lands adapted to abut a diffusion media forming a channel therebetween, wherein the channel distributes a reactant gas to the anode face; and a third plate disposed between the first plate and the second plate, the third plate adapted to abut at least one of the lands of the second plate forming a channel therebetween, wherein the channel permits a fluid to flow therethrough to assist in thermal regulation of the fuel cell.

14. The fuel cell stack according to claim 13, wherein the porous material of the first plate is at least one of a porous metal material, a porous carbon-based material, a microtruss material, and a porous multi-layer material.

15. The fuel cell stack according to claim 13, wherein at least one of the second plate and the third plate is produced from at least one of a metal material and a non-metal material.

16. The bipolar plate according to claim 1, wherein the first plate, the second plate, and the third plate are bonded together.

17. The bipolar plate according to claim 1, wherein the second plate comprises a metal material.

18. The bipolar plate according to claim 1, wherein the plurality of lands is adapted to abut the diffusion media to define therebetween a plurality of substantially parallel spaced apart channels.

19. The bipolar plate according to claim 18, wherein the channels are defined by a first radius and a second radius.

20. The bipolar plate according to claim 1, wherein the third plate is a substantially fluid impermeable, electrically and thermally conductive, corrosion resistant sheet comprising a metal material.

* * * * *